United States Patent
Ishigaki

(10) Patent No.: US 11,766,981 B2
(45) Date of Patent: Sep. 26, 2023

(54) OCCUPANT PROTECTION DEVICE

(71) Applicant: Autoliv Development AB, Vargarda (SE)

(72) Inventor: Ryota Ishigaki, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 113 days.

(21) Appl. No.: 17/594,471

(22) PCT Filed: Mar. 31, 2020

(86) PCT No.: PCT/JP2020/014769
§ 371 (c)(1),
(2) Date: Oct. 18, 2021

(87) PCT Pub. No.: WO2020/217877
PCT Pub. Date: Oct. 29, 2020

(65) Prior Publication Data
US 2022/0176905 A1    Jun. 9, 2022

(30) Foreign Application Priority Data

Apr. 22, 2019   (JP) ................. 2019-081248

(51) Int. Cl.
*B60R 21/207*   (2006.01)
*B60R 21/237*   (2006.01)
*B60N 2/427*   (2006.01)

(52) U.S. Cl.
CPC ........ *B60R 21/207* (2013.01); *B60N 2/42763* (2013.01); *B60R 21/237* (2013.01)

(58) Field of Classification Search
None
See application file for complete search history.

(56) References Cited

U.S. PATENT DOCUMENTS

| 7,784,866 | B2 * | 8/2010 | Yoshikawa | B60N 2/42763 297/216.1 |
| 8,641,086 | B2 * | 2/2014 | Hashido | B60N 2/4279 280/743.1 |
| 10,427,565 | B2 * | 10/2019 | Sasaki | B60N 2/42754 |
| 10,710,540 | B2 * | 7/2020 | Fukawatase | B60N 2/42718 |

(Continued)

FOREIGN PATENT DOCUMENTS

| CN | 115362087 A * | 11/2022 | ............... B60N 2/42 |
| JP | 2007-118820 A | 5/2007 | |

(Continued)

*Primary Examiner* — Faye M Fleming
(74) *Attorney, Agent, or Firm* — Foley & Lardner LLP

(57) ABSTRACT

An occupant protecting device provided inside or below a seat cushion of a vehicle seat, containing: an airbag cushion capable of expanding and deploying to push up a seat surface of the seat cushion; and an inflator that supplies gas for expansion and deployment into the airbag cushion in the event of a vehicle emergency. The airbag cushion has front attaching points and rear attaching points attached to the vehicle seat side, and an expanding and deploying part that is expanded and deployed by the gas from the inflator. At least a portion of the expanding and deploying part overlaps itself in an up-down direction by folding between front attaching points and rear attaching points in a condition prior to expanding and deploying.

19 Claims, 7 Drawing Sheets

(56) References Cited

U.S. PATENT DOCUMENTS

| | | | |
|---|---|---|---|
| 11,260,818 B2 * | 3/2022 | Iida | B60R 21/233 |
| 2005/0184490 A1 * | 8/2005 | Itoga | B60N 2/4279 |
| | | | 280/730.1 |

FOREIGN PATENT DOCUMENTS

| | | | | |
|---|---|---|---|---|
| JP | 2010-52535 A | | 3/2010 | |
| JP | 2013-75599 A | | 4/2013 | |
| KR | 20230037603 A | * | 3/2023 | ............... B60N 2/42 |

\* cited by examiner (a)

(b)

OCCUPANT PROTECTION DEVICE

TECHNICAL FIELD

The present invention relates to an occupant protecting device provided inside or below a seat cushion of a vehicle seat.

BACKGROUND TECHNOLOGY

In the event of a vehicle frontal collision, an occupant will move forward due to inertia. Patent Document 1 describes an occupant protecting device which, in the event of such a frontal collision, raises a front end portion of a seat cushion by instantaneously expanding an airbag in a vehicle seat, thereby suppressing forward movement of the waist of an occupant.

PRIOR ART DOCUMENTS

Patent Documents

Patent Document 1: Japanese Unexamined Patent Application No. 2007-118820

SUMMARY OF THE INVENTION

Problem to be Solved by the Invention

In Patent Document 1, a knee of an occupant is pushed up by the front end portion of the seat cushion when the airbag is expanded. However, based on the relationship to an attachment mode and arrangement position of the airbag with regard to the vehicle seat, the knee of the occupant is not sufficiently lifted. In order to effectively lift the knee of an occupant, the vicinity of the thigh near the buttocks of the occupant is preferably pushed up to lift up a portion from the thigh of the occupant to the knee as a whole, rather than pushing up only the knee of the occupant as in Patent Document 1.

An object of the present invention is to provide an occupant protecting device that contributes to improving the waist restraining performance of an occupant.

Means for Solving the Problems

An occupant protecting device according to one aspect of the present invention is an occupant protecting device provided inside or below a seat cushion of a vehicle seat, containing: an airbag cushion capable of expanding and deploying to push up a seat surface of the seat cushion; and an inflator that supplies gas for expansion and deployment into the airbag cushion in the event of a vehicle emergency, where the airbag cushion has: at least one first attaching point attached to the vehicle seat side; at least one second attaching point attached to the vehicle seat side on a rear side of the at least one first attaching point in a front-rear direction of the vehicle seat; and an expanding and deploying part that is expanded and deployed by the gas from the inflator, and at least a portion of the expanding and deploying part overlaps itself in an up-down direction by folding between the at least one first attaching point and the at least one second attaching point in a condition prior to expanding and deploying.

According to this aspect, the portion of the expanding and deploying portion of the airbag cushion that overlaps between the first and second attaching points in the condition prior to expansion and deployment expands to eliminate the overlap during expansion and deployment. Thereby, as compared to an airbag cushion without such an overlapping portion, an upward expansion between the two attaching points increases, and the airbag cushion expands up to a position beyond the two attaching points in the front-rear direction, during expansion and deployment. Therefore, the seat surface can be pushed up higher and for a longer range in the front-rear direction. Therefore, if an occupant seated on a seat surface in a regular posture is present, in relation to the occupant, the vicinity of the thigh near the buttocks of the occupant can be effectively pushed up, and thus a portion from the thigh to the knee of the occupant can be lifted up as a whole. Therefore, the waist restraining performance of the occupant can be improved.

An occupant protecting device according to another aspect of the present invention is an occupant protecting device provided inside or below a seat cushion of a vehicle seat, containing: an airbag cushion capable of expanding and deploying to push up a seat surface of the seat cushion; an inflator that supplies gas for expansion and deployment into the airbag cushion in the event of a vehicle emergency, where the airbag cushion has: at least one first attaching point attached to a first securing position of the vehicle seat; and at least one second attaching point attached to a second securing position of the vehicle seat on a rear side of the at least one first attaching point in a front-rear direction of the vehicle seat, and the airbag cushion has a distance between the at least one first attaching point and the at least one second attaching point that is longer than a distance between the first securing position and the second securing position, in a flatly spread out condition prior to attaching to the vehicle seat.

According to this aspect, as compared to a case where the distance of both is the same, the airbag during expansion and deployment has an increased upward expansion between the two attaching points, and expands up to a position beyond the two attaching points in the front-rear direction. Therefore, similarly to the above, the waist restraining performance of an occupant can be improved.

An occupant protecting device according to yet another aspect of the present invention is an occupant protecting device provided inside or below a seat cushion of a vehicle seat, containing: an airbag cushion capable of expanding and deploying to push up a seat surface of the seat cushion; an inflator that supplies gas for expansion and deployment into the airbag cushion in the event of a vehicle emergency, where the airbag cushion has: at least one first attaching point attached to the vehicle seat side; and at least one second attaching point attached to the vehicle seat side on a rear side of the at least one first attaching point in a front-rear direction of the vehicle seat, and the airbag cushion expands and deploys between the at least one first attaching point and the at least one second attaching point and expands and deploys up to a position beyond the at least one first attaching point and the at least one second attaching point in the front-rear direction of the vehicle seat.

According to this aspect, similar to the above, the waist restraining performance of an occupant can be improved.

MODE FOR CARRYING OUT THE INVENTION

An occupant protecting device according to preferred embodiments of the present invention will be described with reference to the accompanying drawings. In present document, up and down, left and right, and front and rear are defined as follows. When an occupant is seated in a seat (vehicle seat) in a regular posture, a direction the occupant faces is referred to as the front, a opposite direction is referred to as the rear, and directions indicating a coordinate axis is referred to as a front-rear direction. Furthermore, when the occupant is seated in the vehicle seat in a regular posture, the right of the occupant is referred to as a right direction, the left of the occupant is referred to as a left direction, and directions indicating a coordinate axis is referred to as a left-right direction. Similarly, when the occupant is seated in a regular posture, a head direction of the occupant is referred to as up, a waist direction of the occupant is referred to as down, and directions indicating a coordinate axis is referred to as an up-down direction.

Figure 1A:
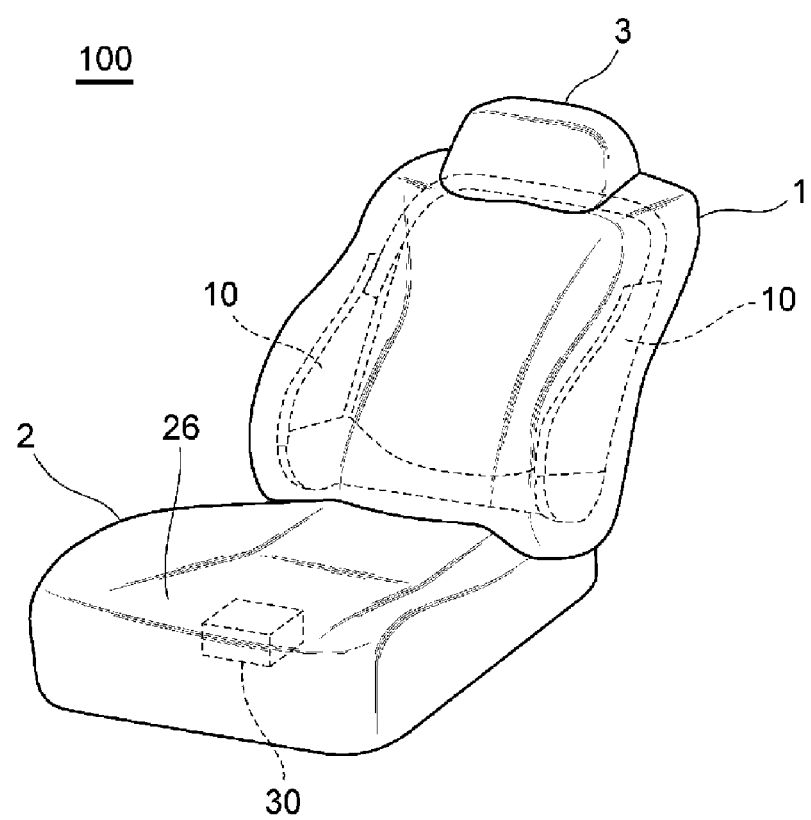
FIG. 1A is a perspective view illustrating an external shape of a vehicle seat provided with an occupant protecting device according to an embodiment.
Figure 1B:
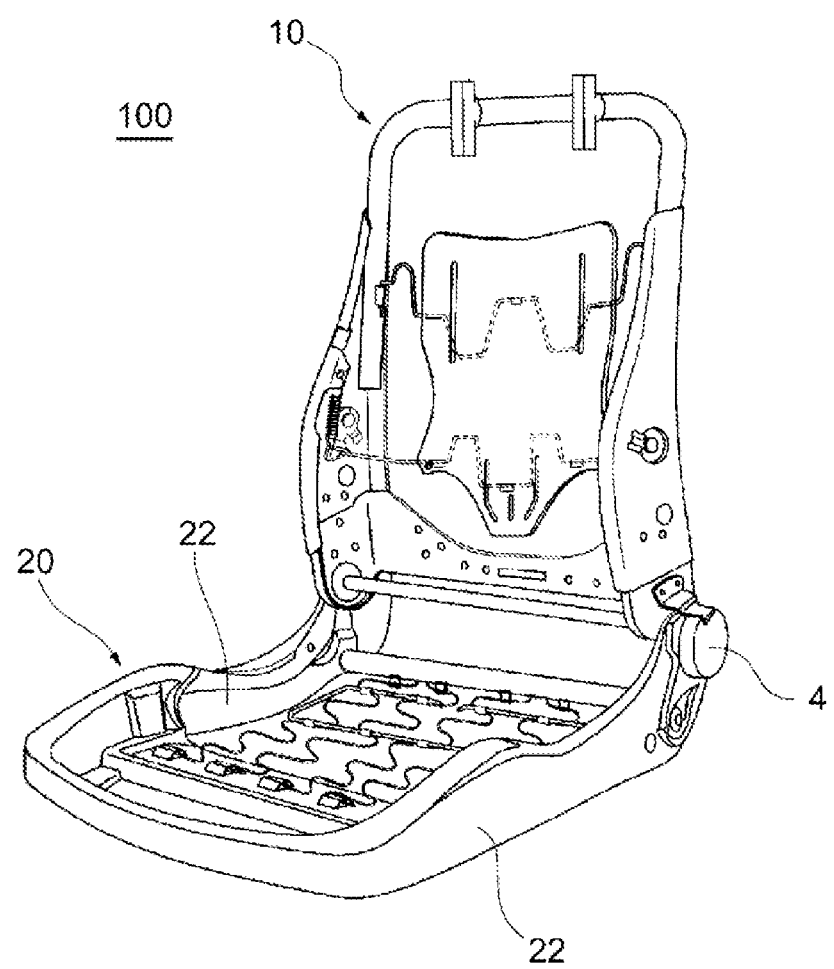
FIG. 1B is a perspective view illustrating a frame structure inside the vehicle seat of FIG. 1.

As illustrated in FIG. 1, a vehicle seat 100 is provided with a seatback 1 that supports the back of an occupant, a seat cushion 2 on which the occupant sits, and a headrest 3 that supports the head of the occupant. The vehicle seat 100 is, for example, a driver seat or passenger seat, but may be a rear seat.

A seat frame 10 and a seating frame 20, which form the framework of the seat, are provided inside the seat back 1 and the seat cushion 2, respectively. The seat frame 10 and the seating frame 20 are obtained by processing a metal component or hard resin, and are mutually connected via a reclining mechanism 4. The seating frame 20 has a pair of side frames 22, 22 spaced apart on the left and right, and a seat pan 24 (see FIGS. 3 and 8) is bridged between the pair of side frames 22, 22.

The seat cushion 2 has, for example, a seat pad made of a urethane foam material or the like covering a surface and perimeter of the seating frame 20, and a seat cover made of leather, fabric or the like covering a surface of the seat pad. An upper surface of the seat cover configures a surface on which the occupant sits, in other words, a seat surface 26 of the seat cushion 2.

The occupant protecting device 30 is provided inside or below the seat cushion 2. For example, the occupant protecting device 30 is provided inside the seat cushion 2, and is covered by the seat cover. In this case, the occupant protecting device 30 may be provided on an upper surface of the seat pan 24. Alternatively, if the seat pan 24 is not provided, placing in the seating frame 20 is possible. In another example, the occupant protecting device 30 is provided below the seat cushion 2 instead of inside the seat cushion 2. In this case, for example, the occupant protecting device 30 is mounted on a bracket secured to the vehicle seat 100 below the seat cushion 2. Hereinafter, an example in which the occupant protecting device 30 is provided on the upper surface of the seat pan 24 will be described.

As illustrated in FIG. 2, the occupant protecting device 30 is provided with an airbag cushion 32 capable of expansion and deployment, and an inflator 34 (see FIG. 8) that supplies gas for expansion and deployment to an interior of the airbag cushion 32 in the event of a vehicle emergency. An example of a vehicle emergency is a frontal collision of a vehicle. Note that in FIG. 2, the inflator 34 is omitted.

The inflator 34 is electrically connected to a vehicle side ECU. For example, the inflator 34 receives a signal that an impact upon a frontal collision of the vehicle has been detected from the vehicle side ECU and operates to instantly supply the gas to the airbag cushion 32. The inflator 34 can be one of various types of inflators, such as inflators filled with a gas generating agent, compressed gas, or both, and the like. By way of example, the inflator 34 has an igniting device at an open end portion of a cylindrical body with a bottom. Furthermore, when a gas generating agent in the cylindrical body is ignited using the igniting device, gas is generated, and the gas for expansion and deployment is supplied into the airbag cushion 32 from a plurality of injection holes located on a peripheral surface of the cylindrical body.

Figure 2A:
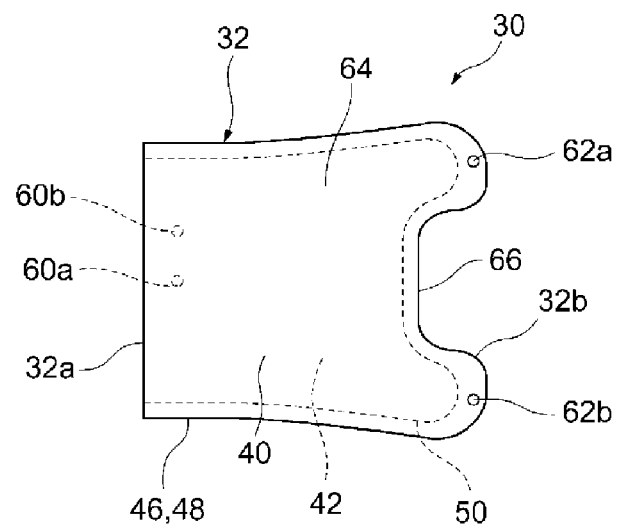
FIG. 2A is a plan view illustrating a condition in which an airbag cushion of the occupant protecting device according to the embodiment after stitching is flatly spread out.
Figure 2B:
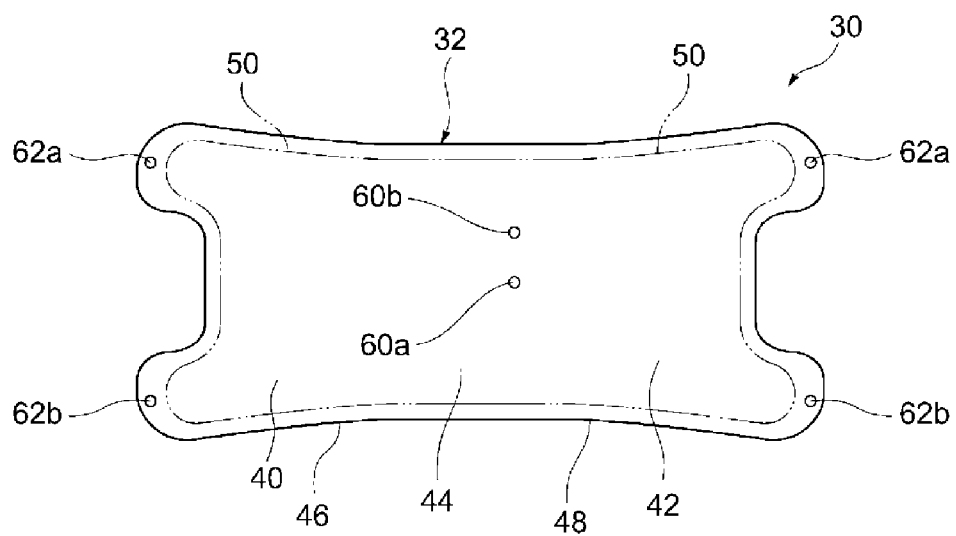
FIG. 2B is a plan view illustrating a condition in which an airbag cushion of the occupant protecting device according to the embodiment prior to stitching is flatly spread out.

The airbag cushion 32 is a bag body and expands and deploys by receiving the supply of gas from the inflator 34. The airbag cushion 32 is formed, for example, by stitching or adhering one or a plurality of pieces of base materials or the like at an appropriate position. By way of a preferred example, the airbag cushion 32 is formed by stitching together a front base material 40 and a back base material 42. In this formation, first, as illustrated in FIG. 2B, one piece of a base material 44 is folded at the center of in a longitudinal direction thereof, and the folded portions are overlapped with each other as illustrated in FIG. 2A. Furthermore, for the front base material 40, which is an upper portion of the overlap, and the back base material 42, which is a lower portion, respective peripheral edge portions 46, 48 are stitched together by a seam 50. Thereby, an air chamber (bag) is delineated between the front base material 40 and the back base material 42, on an inner side from the seam 50. Gas from the inflator 34 is supplied to the air chamber, such that a chamber delineating portion of the front and back base materials 40, 42 expands and deploys.

The airbag cushion 32 has two front attaching points 60a, 60b (first attaching points), two rear attaching points 62a, 62b (second attaching points), and an expanding and deploying part 64 that is expanded and deployed by gas from the inflator 34. The front attaching points 60a, 60b and the rear attaching points 62a, 62b are attached to predetermined positions on the vehicle seat 100 side. The rear attaching points 62a, 62b are attached to the vehicle seat 100 side on a rear side of the front attaching points 62a, 62b in the front-rear direction of the vehicle seat 100. The expanding and deploying part 64 is a portion that delineates the air chamber described above. In other words, the expanding and deploying part 64 is configured from portions of the front base material 40 and the back base material 42 on an inner side from the seam 50.

The front attaching points 60a, 60b are provided in a vicinity of a front end portion 32a of the airbag cushion 32 and are spaced apart from each other in the left-right direction. Herein, the front attaching point 60a is provided in a vicinity of a center portion of the front end portion 32a of the airbag cushion 32, and the front attaching point 60b is provided at a position displaced in the left-right direction from the vicinity of the center portion. The front attaching points 60a, 60b are, for example, holes through which a fastener is used, and are formed in the back base material 42 at a pre-stitching stage illustrated in FIG. 2B. Furthermore, the front attaching points 60a, 60b are positioned on an inner side from the seam 50. However, in another embodiment, the front attaching points 60a, 60b may be positioned on an outer side from the seam 50.

Figure 4A:
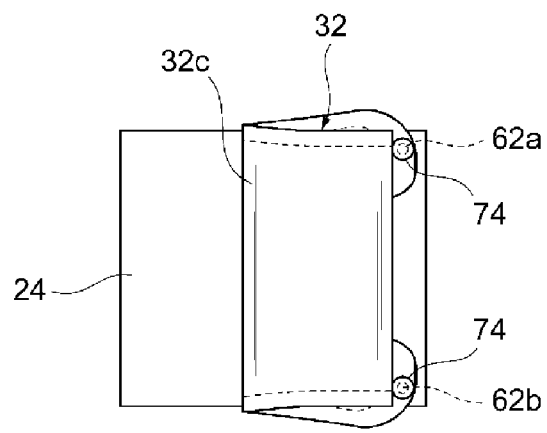
FIG. 4A is a plan view illustrating a condition of the airbag cushion of FIG. 2A after attaching to the seat pan of the vehicle seat and prior to folding.
Figure 4B:
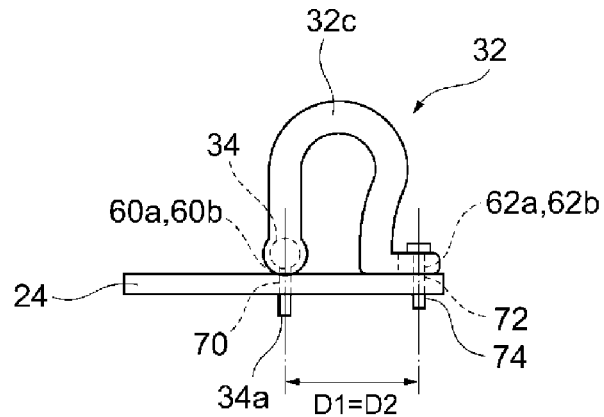
FIG. 4B is a side surface view illustrating a condition of the airbag cushion of FIG. 2A after attaching to the seat pan of the vehicle seat and prior to folding.

The front attaching points 60a, 60b may also serve as attaching points for attaching the inflator 34 to the vehicle seat 100 side. For example, when the aforementioned cylindrical body with a bottom is used as the inflator 34, an axial direction of the cylindrical body is aligned with the left-right direction, and the cylindrical body is stored inside the airbag cushion 32. Furthermore, a pair of left and right stud bolts 34a (see: FIG. 4B) protruding from an outer peripheral portion of the cylindrical body (see: FIG. 4B) protrude to an outer side from the airbag cushion 32 (below the back base material 42) and are fastened and secured to the seat pan 24 by nuts. Thereby, the inflator 34 and the airbag cushion 32 are co-fastened to the seat pan 24 by the stud bolts 34a and nuts. The co-fastened points configure the front attaching points 60a, 60b for attaching the airbag cushion 32 to the vehicle seat 100 side and configured an attaching point for attaching the inflator 34 to the vehicle seat 100 side.

The rear attaching points 62a, 62b are provided in a vicinity of a rear end portion 32b of the airbag cushion 32 and are spaced apart from each other in the left-right direction. The rear attaching points 62a, 62b are, for example, holes through which a fastener is used, and are formed at each corner portion of the front base material 40 and the back base material 42 in the pre-stitching stage illustrated in FIG. 2B. Furthermore, the rear attaching points 62a, 62b are positioned on an outer side from the seam 50. Therefore, the rear attaching points 62a, 62b are provided on a non-expanding portion of the airbag cushion 32, not on the expanding and deploying part 64.

The airbag cushion 32 has a recessed part 66 between the rear attaching points 62a, 62b. The recessed part 66 is an empty space formed to extend toward the expanding and deploying part 64 when the airbag cushion 32 is viewed from the rear. From another perspective, the recessed part 66 is formed, and therefore, the rear attaching points 62a, 62b of the airbag cushion 32 protrude toward the rear of the airbag cushion 32. The recessed part 66 is formed in a center portion of the rear end portion 32b of the airbag cushion 32. The length of the recessed part 66 in the front-rear direction is, for example, approximately ¼ of the length connecting the front end portion 32a and the rear end portion 32b of the airbag cushion 32.

Figure 3A:
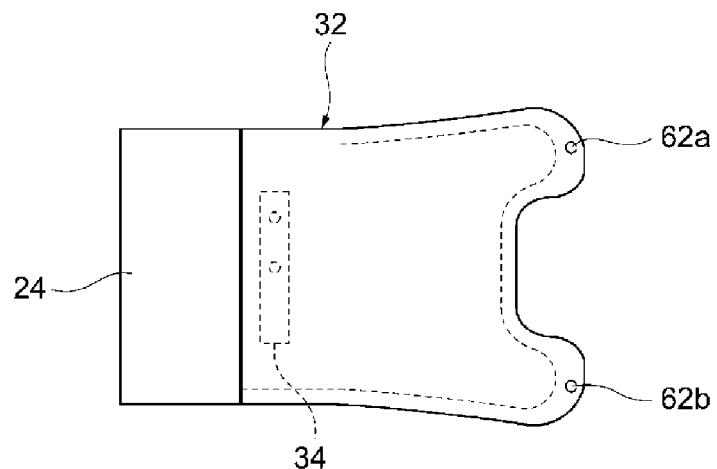
FIG. 3A is a plan view illustrating a condition in which the airbag cushion of FIG. 2A is flatly spread out prior to attaching to a seat pan of the vehicle seat.
Figure 3B:
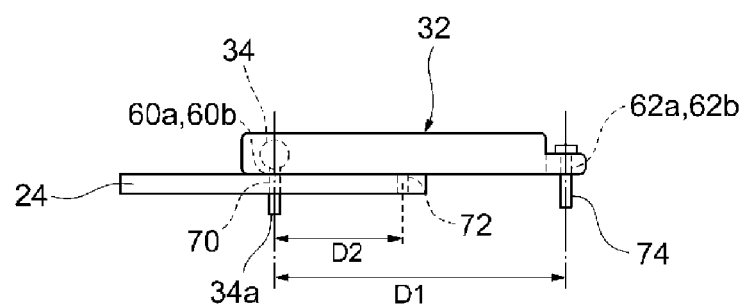
FIG. 3B is a side surface view illustrating a condition in which the airbag cushion of FIG. 2A is flatly spread out after attaching to a seat pan of the vehicle seat.
Figure 5A:
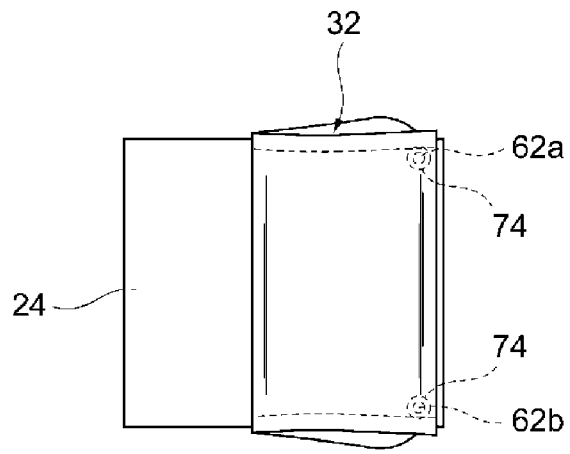
FIG. 5A is a plan view illustrating a condition of the airbag cushion of FIG. 2A after attaching to the seat pan of the vehicle seat and after folding.
Figure 5B:
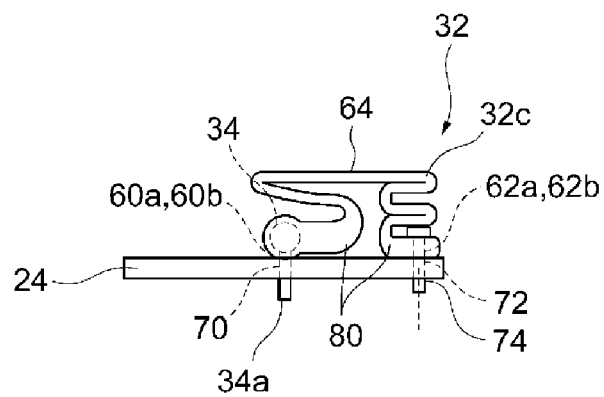
FIG. 5B is a side surface view illustrating a condition of the airbag cushion of FIG. 2A after attaching to the seat pan of the vehicle seat and after folding.

Next, attachment of the airbag cushion 32 on the seat pan 24 will be described with reference to FIGS. 3 to 5. As illustrated in FIGS. 3 to 5, the seat pan 24 is provided with a first securing position 70 (first securing position) for attaching the front attaching points 60a, 60b of the airbag cushion 32 and a rear securing position 72 (second securing position) for attaching the rear attaching points 62a, 62b of the airbag cushion 32. The front securing position 70 and the rear securing position 72 are, for example, positions of securing holes formed in the seat pan 24. Note that in relation to an occupant seated in a regular posture, the rear securing position 72 goes below a portion of a thigh of the occupant near the buttocks.

FIG. 3 illustrates a condition in which the airbag cushion 32 is flatly spread out prior to attaching to the seat pan 24. In this condition, a distance D1 between the front attaching points 60a, 60b and the rear attaching points 62a, 62b is longer than a distance D2 between the front securing position 70 and the rear securing position 72 (D1>D2). Note that the distances D1 and D2 refer to lengths in the front-rear direction. The distance D1 is, for example, 29.5 cm, and the distance D2 is, for example, 6.5 cm.

FIG. 4 illustrates a condition of the airbag cushion 32 after attaching to the seat pan 24 and prior to folding. When attaching to the seat pan 24, the front attaching points 60a, 60b are attached to the front securing position 70, for example, via the stud bolt 34a of the inflator 34, and the rear attaching points 62a, 62b are attached to the rear securing position 72, for example, via a fastener 74 such as a bolt, rivet, or the like. In this attached condition, the distance D1 is reduced and becomes equal to the distance D2. Therefore, the airbag cushion 32 will have a slack 32c between the front attaching points 60a, 60b and the rear attaching points 62a, 62b. In other words, the airbag cushion 32 is attached to the upper surface of the seat pan 24 in a condition where the slack 32c is formed on an upper side of the seat pan 24. The amount (length) of the slack 32c corresponds to the difference between the distance D1 and the distance D2 when the airbag cushion 32 is flatly spread out.

FIG. 5 illustrates a condition of the airbag cushion 32 after attaching to the seat pan 24 and after folding. In this condition, the occupant protecting device 30 is provided on the seat pan 24. In other words, FIG. 5 illustrates a condition of the airbag cushion 32 after installation and before the expanding and deploying part 64 expands and deploys. In this condition, at least a portion of the expanding and deploying part 64 overlaps itself in an up-down direction by folding between the front attaching points 60a, 60b and rear attaching points 62a, 62b. The expanding and deploying part 64 has a plurality of folded back portions 80 for forming the overlap in the up-down direction. The number of folded back portions 80 is two, spaced apart in the front-rear direction. Herein, one or a plurality of folded back portions 80 are formed at front and rear positions between the front attaching points 60a, 60b and the rear attaching points 62a, 62b. Thus, after installation, the airbag cushion 32 forms the folded back portion 80 in the expanding and deploying part 64 by folding the slack 32c from an upper side in an accordion-like manner.

In another embodiment, the slack 32c may be folded in a form other than an accordion shape. For example, the slack 32c may be folded in steps in the front-rear direction. Thereby, the expanding and deploying part 64 also has a site that overlap each other in the up-down direction by being folded between the front attaching points 60a, 60b and the rear attaching points 62a, 62b, and a folded back portion for forming the overlap in the up-down direction. In another example, the slack 32c may be folded into a roll shape. In this case, the expanding and deploying part 64 has a site that overlaps itself in an up-down direction by folding between the front attaching points 60a, 60b and rear attaching points 62a, 62b. Furthermore, in another example, the slack 32c can be folded in a form that combines at least two of the accordion shape, step shape and roll shapes.

Figure 6:
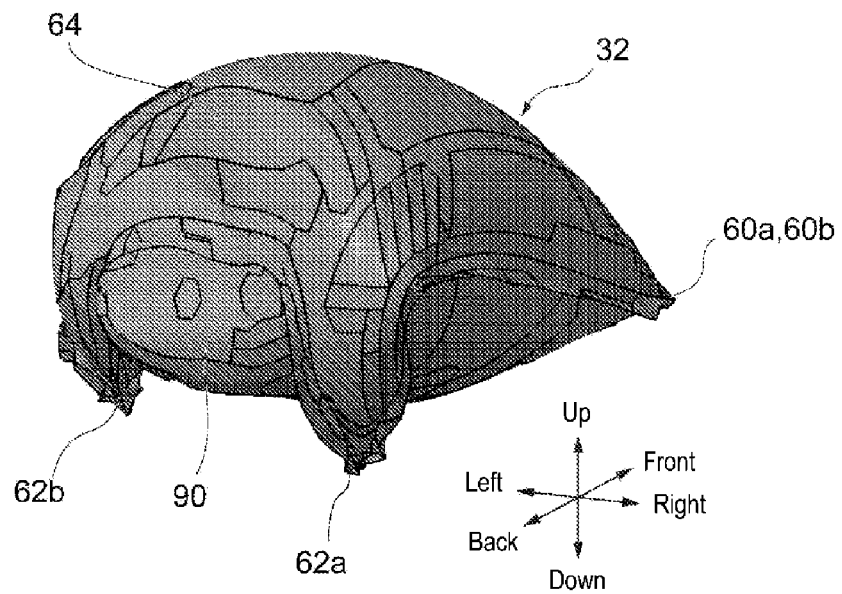
FIG. 6 is a perspective view illustrating the airbag cushion of FIG. 2A after expanding and deploying.

FIG. 6 illustrates the airbag cushion 32 after expanding and deploying.

The expanding and deploying part 64 of the airbag cushion 32 expands and deploys between the front attaching points 60a, 60b and the rear attaching points 62a, 62b, and also expands and deploys up to a position beyond the front attaching points 60a, 60b and the rear attaching points 62a, 62b in the front-rear direction. The slack 32c during attachment is present, and therefore, the expanding and deploying part 64 has an increased expansion between the front attaching points 60a, 60b and the rear attaching points 62a, 62b. In the expanded and deployed condition, a portion of the expanding and deploying part 64 (for example, the folded back portion 80) that overlapped prior to expansion and deployment is eliminated. Furthermore, in the expanded and deployed airbag cushion 32, a space portion 90, which is recessed when viewed from the rear side, is formed on a rear portion of the airbag cushion 32. The space portion 90 is formed at a point corresponding to the recess part 66 of the airbag cushion 32, and is formed in the up-down direction between upper and lower surfaces of the airbag cushion 32.

Figure 7:
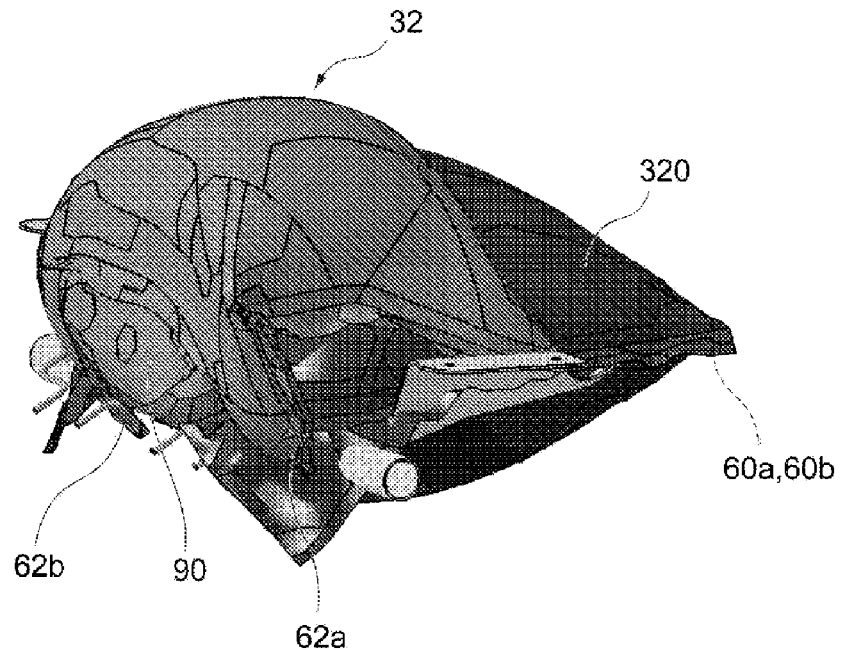
FIG. 7 is a perspective view illustrating the airbag cushion of FIG. 2A after expanding and deploying along with an airbag cushion according to a comparative example after expanding and deploying.

FIG. 7 is a diagram comparing of an airbag cushion 32 according to the embodiment with an airbag cushion 320 according to a comparative example with regard to a condition after expansion and deployment.

Unlike the present embodiment, the airbag cushion 320 according to the comparative example does not have the slack 32c or the recessed part 66. Specifically, in the airbag cushion 320 in a flat spread out condition prior to attaching to the seat pan 24, the distance D1 between the front attaching points 60a, 60b and the rear attaching points 62a, 62b is the same as the distance D2 between the front securing position 70 and the rear securing position 72. Therefore, the airbag cushion 320 after being attached to the seat pan 24 has no folded portions, and an expanding and deploying part of the airbag cushion 320 is not folded between the front attaching points 60a, 60b and the rear attaching points 62a, 62b in a condition prior to expansion and deployment. Furthermore, the airbag cushion 320 does not have the recessed part 66, and therefore is substantially rectangular in plan view in a condition flatly spread out.

As illustrated in FIG. 7, the airbag cushion 320 according to the comparative example expands and deploys between the front attaching points 60a, 60b and the rear attaching points 62a, 62b, but does not expand and deploy up to a position beyond the front attaching points 60a, 60b and the rear attaching points 62a, 62b in the front-rear direction. Furthermore, in the airbag cushion 320, a middle portion in the front-rear direction is expanded to a maximum expansion, and the expansion gradually decreases toward the front attaching points 60a, 60b and the rear attaching points 62a, 62b.

In contrast, the airbag cushion 32 according to the embodiment expands and deploys up to a position beyond the front attaching points 60a, 60b and the rear attaching points 62a, 62b in the front-rear direction. Furthermore, in the airbag cushion 32, an upward expansion between the front attaching points 60a, 60b and the rear attaching points 62a, 62b is greater than in the airbag cushion 320. This is because the airbag cushion 32 has the slack 32c in the condition prior to expansion and deployment, and an overlapping portion formed by the slack 32c (overlapping portion between the front attaching points 60a, 60b and rear attaching points 62a, 62b) expands so as to eliminate the overlap during expansion and deployment.

Furthermore, the airbag cushion 32 has the recessed part 66 (space portion 90 after expansion and deployment), and therefore, the upward expansion during expansion and deployment is further increased. The position of the recessed part 66 is at the center portion of the rear end portion 32b of the airbag cushion 32, the upward expanding effect based on the presence of the recessed part 66 is higher at the rear portion of the airbag cushion 32. As a result, in the airbag cushion 32, a site slightly behind the middle portion in the front-rear direction expands so to a higher position.

Figure 8:
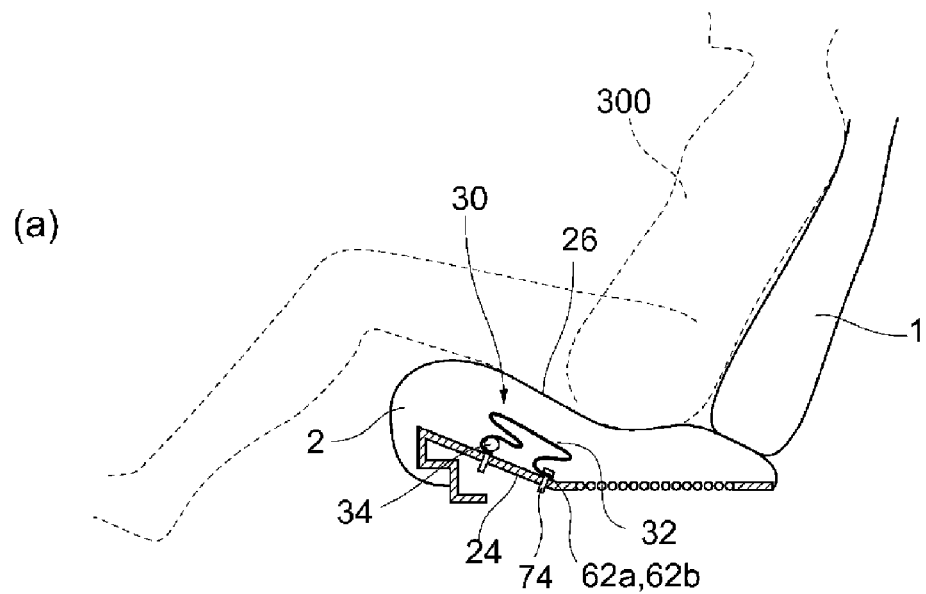
FIG. 8 is a longitudinal cross-sectional view illustrating a condition where the occupant protecting device according to the embodiment is provided on the seat pan of the vehicle seat, where (a) illustrates a condition prior to expansion and deployment and (b) illustrates a condition after expansion and deployment.
Figure 8:
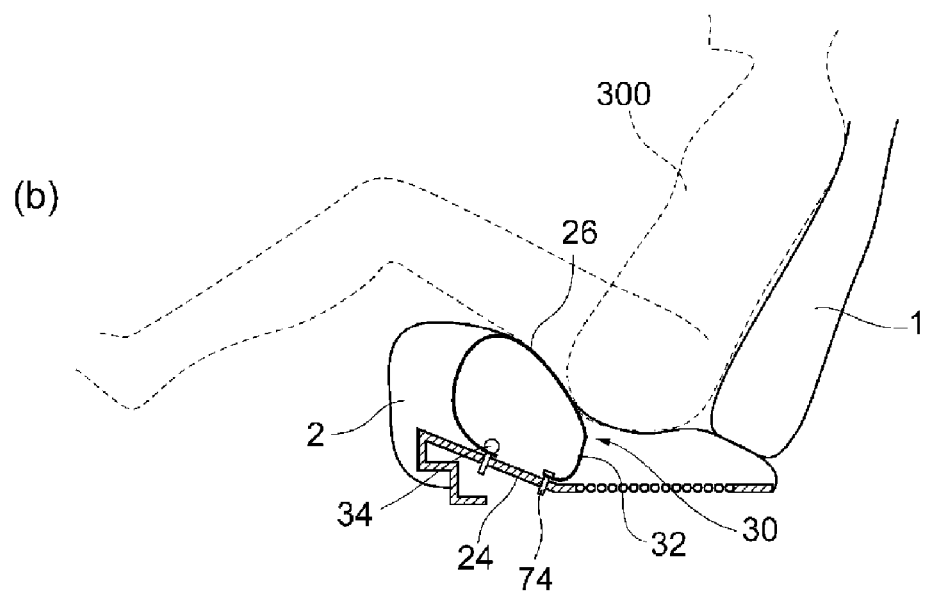

FIG. 8 is a longitudinal cross-sectional view illustrating a condition where the occupant protecting device 30 is provided on the seat pan 24, where (A) illustrates a condition prior to expansion and deployment and (B) illustrates a condition after expansion and deployment. Furthermore, the same drawings schematically illustrate an occupant 300 seated on the seat surface 26 in a regular posture. The airbag cushion 32 is attached to the seat pan 24 such that the rear attaching points 62a, 62b are at a position below a thigh of the occupant 300 near the buttocks. As the airbag cushion 32 expands and deploys, the seat surface 26 of the seat cushion 2 is pushed upward. At this time, the airbag cushion 32 expands as described above, effectively pushing up a vicinity of the thigh of the occupant 300 near the buttocks and effectively lifting up a portion from the thigh to the knee of the occupant 300 as a whole. Thereby, the knee of the occupant 300 can be effectively lifted up, and forward movement of the waist of the occupant 300 can be suppressed.

As described above, the occupant protecting device 30 of one aspect of the present embodiment is provided with the airbag cushion 32 and the inflator 34. The airbag cushion 32 has the front attaching points 60a, 60b, the rear attaching points 62a, 62b, and the expanding and deploying part 64, and at least a portion of the expanding and deploying part 64 is overlaps itself in the up-down direction by being folded between the front attaching points 60a, 60b and the rear attaching points 62a, 62b, in a condition prior to expanding and deploying.

According to this aspect, during expansion and deployment, the overlapping portion of the expanding and deploying part 64 expands so as to eliminate the overlap. Thereby, as compared to the airbag cushion 320 without such an overlapping portion, an upward expansion between the front attaching points 60a, 60b and the rear attaching points 62a, 62b increases, and the airbag cushion expands up to a position beyond the two attaching points in the front-rear direction. Therefore, the seat surface 26 of the seat cushion 2 can be pushed up higher and in a longer range in the front-rear direction. Thus, the vicinity of the thigh of the occupant 300 near the buttocks is effectively pushed up and the portion from the thigh to a knee of the occupant 300 is effectively lifted up as a whole. Therefore, the waist restraining performance of the occupant 300 can be improved.

Furthermore, the number of the rear attaching points 62a, 62b is two or more spaced apart in the left-right direction. The expanding and deploying part 64 does not have a site provided between the rear attaching points 62a, 62b, and the recessed part 66 is formed so as to extend between the rear attaching points 62a, 62b toward the expanding and deploying part 64 when the airbag cushion 32 is viewed from the rear. Thereby, the upward expansion during expansion and deployment is even further increased, and the upward expanding effect is greater at the rear portion of the airbag cushion 32. Therefore, the vicinity of the thigh near the buttocks of the occupant 300 can be even more effectively pushed upward.

Furthermore, the recessed part 66 is formed in a center portion of the rear end portion 32b of the airbag cushion 32. Thereby, an increase in upward expansion due to the presence of the recessed part 66 can be brought to the center portion of the airbag cushion 32 rather than to one side thereof in the left-right direction.

With regard to the occupant protecting device 30 of the present embodiment, another perspective of the aspect described above is as follows. In other words, the occupant protecting device 30 according to another aspect of the present embodiment is provided with the airbag cushion 32 and the inflator 34. The airbag cushion 32 has the front attaching points 60a, 60b and the rear attaching point 62a, 62b respectively attached to the front securing position 70 and the rear securing position 72 of the vehicle seat 100. In a condition where the airbag cushion 32 is flatly spread out prior to being attached to the vehicle seat 100 (see: FIG. 3), the distance D1 between the front attaching points 60a, 60b and the rear attaching points 62a, 62b is longer than the distance D2 between the front securing position 70 and the rear securing position 72.

According to the aspect, the airbag cushion 32 after being attached to the vehicle seat 100 will have a slack 32c between the front attaching points 60a, 60b and the rear attaching points 62a, 62b. During expansion and deployment, expansion occurs such that the slack 32c is eliminated. Therefore, as compared to the airbag cushion 320 without such a slack 32c, upward expansion between the two attaching points increases, and the airbag cushion expands up to a position beyond the two attaching points in the front-rear direction. Therefore, similarly to the above, the vicinity of the thigh of the occupant 300 near the buttocks can be effectively pushed up, and the portion from the thigh to the knee of the occupant 300 can be effectively lifted up as a whole.

With regard to the occupant protecting device 30 of the present embodiment, yet another perspective from the aspect and another aspect described above is as follows. In other words, the occupant protecting device 30 of another aspect of the present embodiment has the airbag cushion 32 and the inflator 34. The airbag cushion 32 has the front attaching points 60a, 60b and rear attaching points 62a, 62b. The airbag cushion 32 expands and deploys between the front attaching points 60a, 60b and the rear attaching points 62a, 62b, and also expands and deploys to a position beyond the front attaching points 60a, 60b and the rear attaching points 62a, 62b in the front-rear direction of the vehicle seat 100. With such an aspect, similarly to the above, the waist restraining performance of an occupant can be improved.

The embodiment described above is for ease of understanding of the present invention and is not intended to be construed as limiting the present invention. Elements included in the embodiment, as well as arrangements, materials, conditions, shapes, sizes, and the like thereof, are not limited to those exemplified, but rather can be appropriately changed.

For example, the number of the front attaching points 60a, 60b may be one or may be three or more. Similarly, the number of the rear attaching points 62a, 62b may be one or may be three or more. If there are three or more rear attaching points, the recessed part 66 is preferably provided between rear attaching points that are adjacent to each other. Furthermore, the front attaching point does not have to also serve as an attaching point for the inflator 34. Furthermore, the airbag cushion 32 may be an OPW airbag.

DESCRIPTION OF CODES

1 . . . Seatback, 10 . . . Seat frame, 2 . . . Seat cushion, 20 . . . Seating frame, 3 . . . Headrest, 4 . . . Reclining mechanism, 22 . . . Side frame, 24 . . . Seat pan, 26 . . . Seat surface, 30 . . . Occupant protecting device, 32 . . . Airbag cushion, 32a . . . Front end portion, 32b . . . Rear end portion, 32c . . . Slack, 34 . . . Inflator, 34a . . . Stud bolt 34, 40 . . . Front base material, 42 . . . Back base material, 44 . . . Base material, 46, 48 . . . Peripheral edge portion, 50 . . . Seam, 60a, 60b . . . Front attaching point, 62a, 62b . . . Rear attaching point, 64 . . . Expanding and deploying part, 66 . . . Recessed part, 70 . . . Front securing position, 72 . . . Back securing position, 74 . . . Fastener, 80 . . . Folded back portion, 90 . . . Space portion, 100 . . . Vehicle seat, 300 . . . Occupant, 320 . . . Airbag cushion, D1, D2 . . . Distance

The invention claimed is:

1. An occupant protecting device provided inside or below a seat cushion of a vehicle seat, comprising:
   an airbag cushion capable of expanding and deploying to push up a seat surface of the seat cushion, wherein the airbag cushion is formed by stitching together a front base material and a back base material; and
   an inflator that supplies gas for expansion and deployment into the airbag cushion in the event of a vehicle emergency, wherein
   the airbag cushion has:
   at least one first attaching point attached to the vehicle seat side;
   at least one second attaching point attached to the vehicle seat side on a rear side of the at least one first attaching point in a front-rear direction of the vehicle seat; and
   an expanding and deploying part that is expanded and deployed by the gas from the inflator, and
   at least a portion of the expanding and deploying part overlaps itself in an up-down direction by folding between the at least one first attaching point and the at least one second attaching point in a condition prior to expanding and deploying.

2. The occupant protecting device according to claim 1, wherein
   the number of the at least one second attaching point is two or more spaced apart in the left-right direction of the vehicle seat,
   the expanding and deploying part does not have a site between the two or more second attaching points, and
   the airbag cushion has a recessed part formed between the two or more second attaching points so as to extend toward the expanding and deploying part when the airbag cushion is view from the rear.

3. The occupant protecting device according to claim 2, wherein
   the number of the two or more second attaching points is two, and the recessed part is formed on a center portion of a rear end portion of the airbag cushion.

4. The occupant protecting device according to claim 1, wherein the expanding and deploying part has a folded back portion for forming an overlap in the up-down direction between the at least one first attaching point and the at least one second attaching point in a condition prior to expanding and deploying.

5. The occupant protecting device according to claim 4, wherein the number of the folded back portions is two or more spaced apart in the front-rear direction of the vehicle seat.

6. The occupant protecting device according to claim 1, wherein the at least one first attaching point also serves as an attaching point for attaching the inflator to the vehicle seat side.

7. The occupant protecting device according to claim 1, wherein the at least one second attaching point is positioned on an outer side of a seam stitched between the front base material and the back base material.

8. An occupant protecting device provided inside or below a seat cushion of a vehicle seat, comprising:
    an airbag cushion capable of expanding and deploying to push up a seat surface of the seat cushion; and
    an inflator that supplies gas for expansion and deployment into the airbag cushion in the event of a vehicle emergency, wherein
    the airbag cushion has:
    at least one first attaching point attached to a first securing position of the vehicle seat; and
    at least one second attaching point attached to a second securing position of the vehicle seat on a rear side of the at least one first attaching point in a front-rear direction of the vehicle seat, and
    the airbag cushion has a distance between the at least one first attaching point and the at least one second attaching point that is longer than a distance between the first securing position and the second securing position, in a flatly spread out condition prior to attaching to the vehicle seat.

9. The occupant protecting device according to claim 8, wherein
    the number of the at least one second attaching point is two or more spaced apart in the left-right direction of the vehicle seat, and
    the airbag cushion has a recessed part formed between the two or more second attaching points such that the two or more second attaching points protrude towards the rear of the airbag cushion.

10. The occupant protecting device according to claim 9, wherein
    the number of the two or more second attaching points is two, and
    the recessed part is formed on a center portion of a rear end portion of the airbag cushion.

11. The occupant protecting device according to claim 8, wherein the at least one first attaching point also serves as an attaching point for attaching the inflator to the vehicle seat side.

12. The occupant protecting device according to claim 8, wherein the airbag cushion is formed by stitching together a front base material and a back base material.

13. The occupant protecting device according to claim 12, wherein the at least one second attaching point is positioned on an outer side of a seam stitched between the front base material and the back base material.

14. An occupant protecting device provided inside or below a seat cushion of a vehicle seat, comprising:
    an airbag cushion capable of expanding and deploying to push up a seat surface of the seat cushion; and
    an inflator that supplies gas for expansion and deployment into the airbag cushion in the event of a vehicle emergency, wherein
    the airbag cushion has:
    at least one first attaching point attached to the vehicle seat side;
    at least one second attaching point attached to the vehicle seat side on a rear side of the at least one first attaching point in a front-rear direction of the vehicle seat; and
    an expanding and deploying part that is expanded and deployed by the gas from the inflator, and
    at least a portion of the expanding and deploying part overlaps itself in an up-down direction by folding between the at least one first attaching point and the at least one second attaching point in a condition prior to expanding and deploying, wherein the expanding and deploying part has a folded back portion for forming an overlap in the up-down direction between the at least one first attaching point and the at least one second attaching point in a condition prior to expanding and deploying.

15. The occupant protecting device according to claim 14, wherein
    the number of the at least one second attaching point is two or more spaced apart in the left-right direction of the vehicle seat,
    the expanding and deploying part does not have a site between the two or more second attaching points, and
    the airbag cushion has a recessed part formed between the two or more second attaching points so as to extend toward the expanding and deploying part when the airbag cushion is view from the rear.

16. The occupant protecting device according to claim 15, wherein
    the number of the two or more second attaching points is two, and
    the recessed part is formed on a center portion of a rear end portion of the airbag cushion.

17. The occupant protecting device according to claim 14, wherein the number of the folded back portions is two or more spaced apart in the front-rear direction of the vehicle seat.

18. The occupant protecting device according to claim 14, wherein the at least one first attaching point also serves as an attaching point for attaching the inflator to the vehicle seat side.

19. The occupant protecting device according to claim 14, wherein the at least one second attaching point is positioned on an outer side of a seam stitched between the front base material and the back base material.

* * * * *